(No Model.)

B. BOSCH.
WAGON BRAKE.

No. 310,174. Patented Jan. 6, 1885.

Witnesses:
H. Hadley
Thomas Hedy Jr

Inventor:
Berthold Bosch, per
H. F. Rohde, Atty

UNITED STATES PATENT OFFICE.

BERTHOLD BOSCH, OF BURLINGTON, IOWA.

WAGON-BRAKE.

SPECIFICATION forming part of Letters Patent No. 310,174, dated January 6, 1885.

Application filed August 21, 1884. (No model.)

*To all whom it may concern:*

Be it known that I, BERTHOLD BOSCH, a citizen of the United States, residing at Burlington, in the county of Des Moines and State of Iowa, have invented a new and useful Wagon-Brake, of which the following is a specification.

My invention relates to improvements in wagon-brakes in which a brake-bar in one piece for both wheels operates in conjunction with levers; and the objects of my improvements are to provide a brake or lock which will do the work more effectually than it is done by any brake now in use, and to furnish a brake very simple in construction and easily applied. I attain these objects by the mechanism illustrated in the accompanying drawings, in which—

Figure 1:
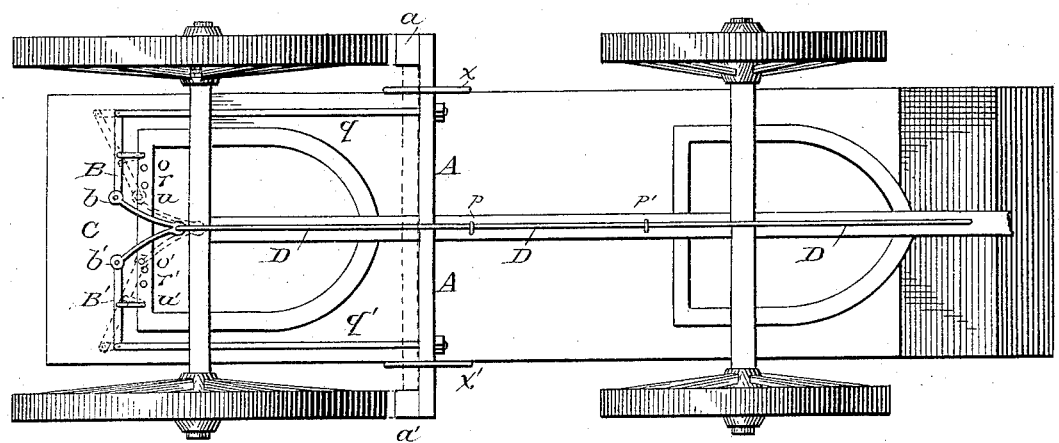
Figure 2:
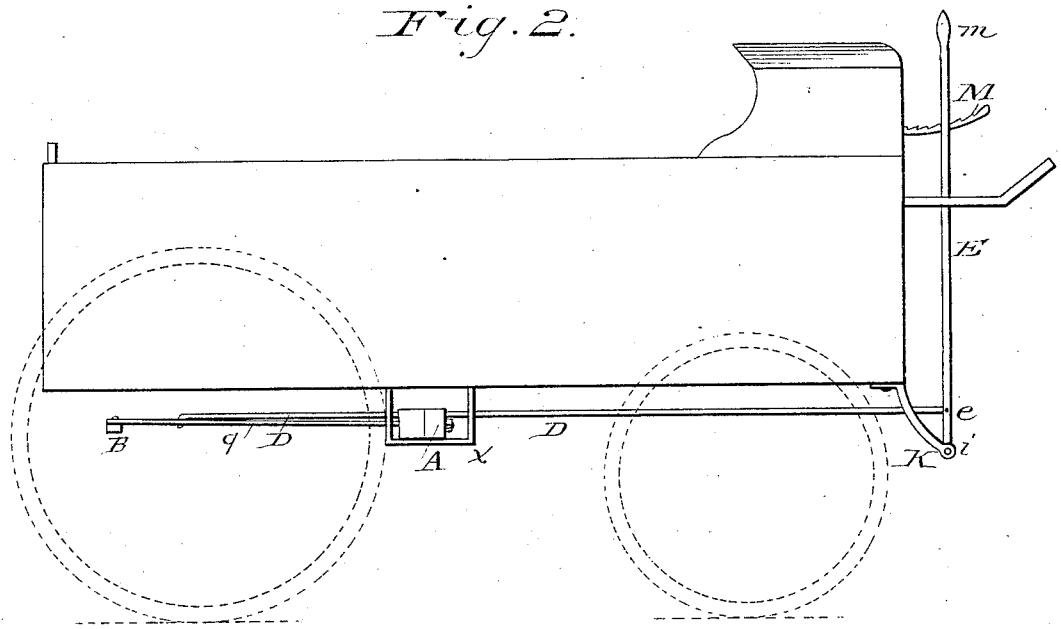

Figure 1 is a bottom plan of a wagon with the brake attached. Fig. 2 is a side view of a wagon, showing the connection of the operating-lever with the brake mechanism.

Similar letters refer to similar parts throughout the several views.

Fig. 1 represents a view of the wagon-bed from below, with the brake attached, in which A represents the brake-bar, having brake-shoes $a$ and $a'$. B and B' are levers pivoted in orifices $o$ $r$ or $u$ and $o'$ $r'$ and $u'$ by means of bolts or otherwise upon cross-bar C, which cross-bar is attached in any suitable manner to the frame or the bed of the wagon. Levers B and B', by means of rods $q$ and $q'$ at $d$ and $d'$, connect with the brake-bar A. $b$ and $b'$ are small bars, jointed, respectively, at one end to B and B', and in their other end to rod D. Rod D runs underneath and along the middle, or may run to either side of the wagon-bed, from the brake to the front of the wagon, and is supported by guides $p$ and $p'$. At $e$ the rod D is connected by bolt with arm E, which arm is at $i$ jointed to the projection $k$, so that arm E will move freely to and fro in the dentated guide M, fastened to the front end of the wagon-box, and may be set into any of the interdental spaces. Arm E has handle $m$.

To the respective sides of the wagon-box, between the front and hind wheels, are the guides $x$ and $x'$, for the purpose of holding brake-bar A.

The operation of my invention is as follows: When arm E rests in guide M and close to the wagon-box, the brake is loose or not in use. If the brake be used, arm E is pushed along the guide M, whereby rod D, connected at $e$ with said arm, is drawn forward, and rod D, by means of bars $b$ and $b'$, also draws the arms of levers B and B', connected therewith, forward, which throws the other arms of B and B' back, whereby, by means of rods $q$ and $q'$, the brake-bar A, with its brake-shoes $a$ and $a'$, is pressed against the wheels, thus holding the wheels in a firm grasp.

The object of having the holes $o$ $r$ or $u$ and $o'$ $r'$ or $u'$ is to be able to adjust the brake properly in order to get more or less power, as it may be desired.

What I claim, and desire to secure by Letters Patent, is—

In a wagon-brake, the brake-bar A, having brake-shoes $a$ and $a'$, and sliding in guides $x$ and $x'$, in combination with rods $q$ and $q'$, levers B and B', bars $b$ and $b'$, rod D, arm E, projection $k$, and dentated guide M, substantially as and for the purpose herein described.

BERTHOLD BOSCH.

Witnesses:
MARTIN MOEHN,
N. S. HAMMACK.